Nov. 10, 1942.    H. SALVATORI    2,301,458
SEISMIC WELL LOGGING
Filed Oct. 31, 1940    3 Sheets-Sheet 1
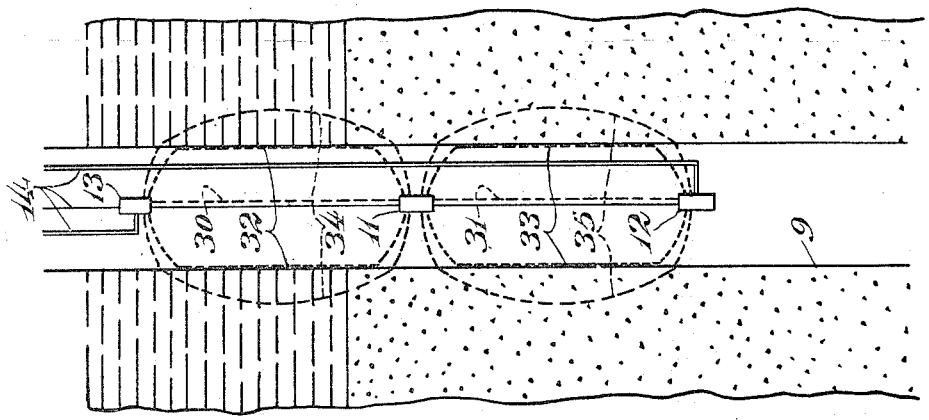
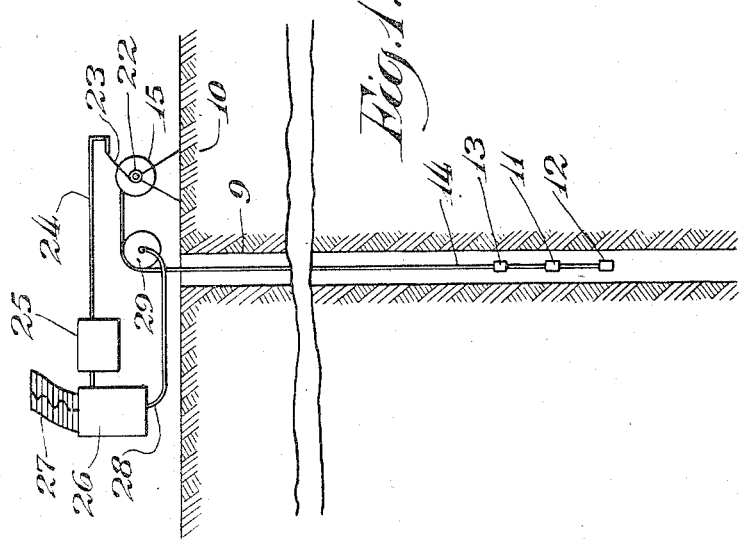
Inventor:
Henry Salvatori
By Geo. L. Parkhurst
Attorney.

Nov. 10, 1942.                    H. SALVATORI                    2,301,458
                              SEISMIC WELL LOGGING
                              Filed Oct. 31, 1940            3 Sheets-Sheet 2
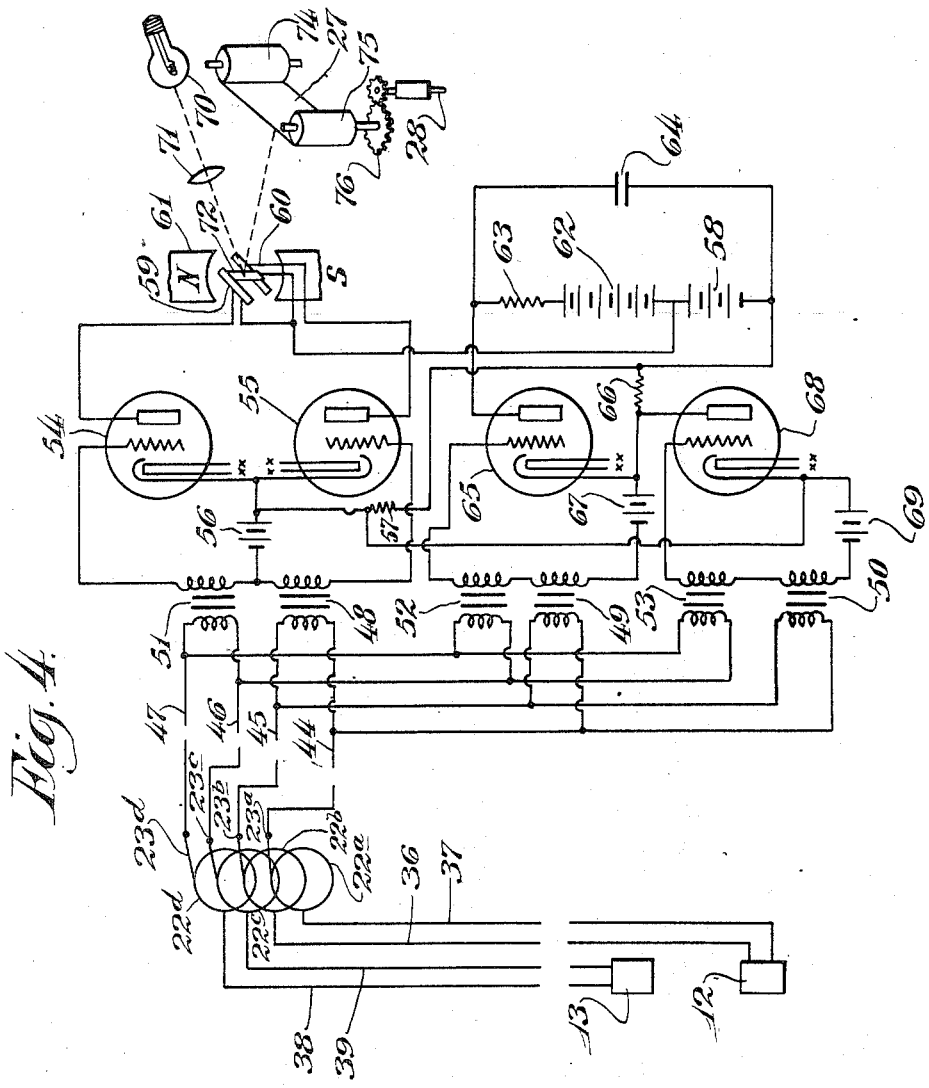
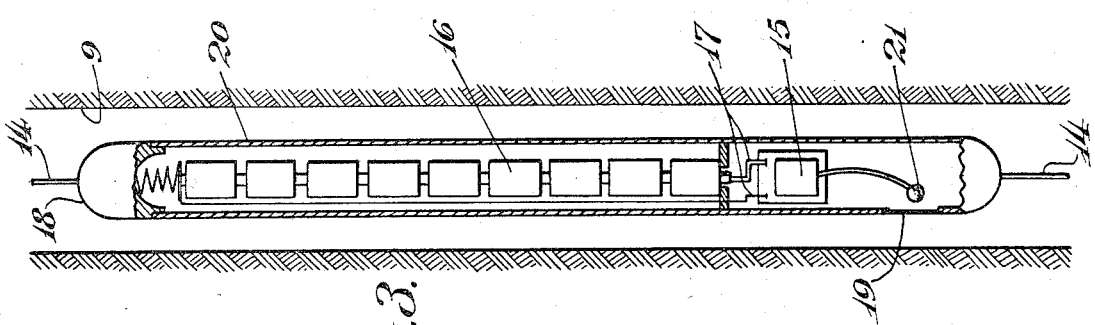

Nov. 10, 1942.    H. SALVATORI    2,301,458
SEISMIC WELL LOGGING
Filed Oct. 31, 1940    3 Sheets-Sheet 3
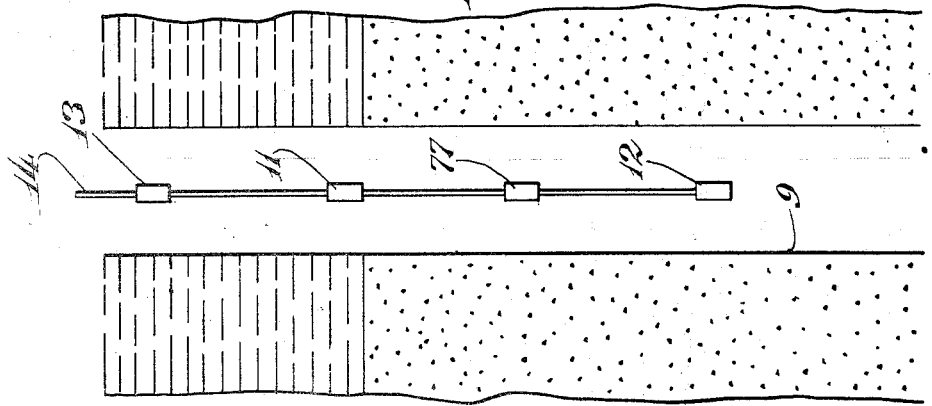
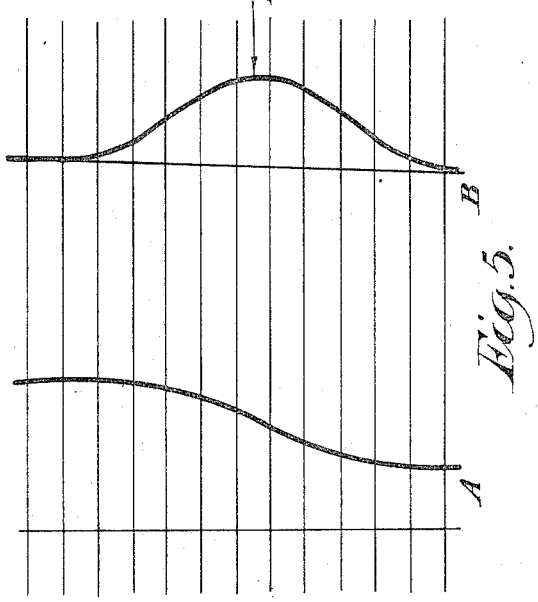
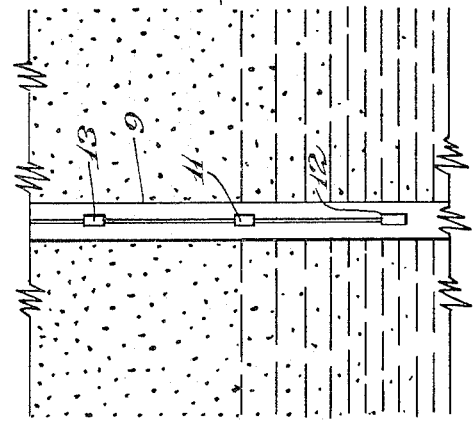
Inventor:
Henry Salvatori
By Geo. L. Parkhurst
Attorney Patented Nov. 10, 1942

2,301,458

UNITED STATES PATENT OFFICE 2,301,458

SEISMIC WELL LOGGING

Henry Salvatori, Los Angeles, Calif., assignor to Stanolind Oil and Gas Company, Tulsa, Okla., a corporation of Delaware Application October 31, 1940, Serial No. 363,685

3 Claims. (Cl. 181—0.5)

This invention pertains to the art which is known as well logging, i. e. to the determination of the properties of the formations traversed by a well or to the correlation of the same stratum in two or more wells.

In the past, identification of such strata and their correlation have been accomplished chiefly by measurement of the electrical properties of these strata such as their so-called self potentials, resistivities, or the like. While these readings often furnish satisfactory data from which such identification or correlation can be made, this is not always the case. One primary difficulty inherent in this method is that the electrical properties of various strata do not necessarily vary with a change in the strata. For example, a porous limestone containing considerable connate water may exhibit the same resistivity characteristics as a tightly packed sandstone which also contains dissolved salts. Furthermore, gradual changes in the lithological character of a stratum over a wide area may not be reflected by similar changes in the electrical properties.

I have discovered a better means of identification and correlating these beds, which takes into account the lithological characteristics of formations. This method depends upon a property of the formations which is much more highly characteristic than the resistivity, namely, the velocity of seismic waves through the rock. For example, the velocity of longitudinal seismic waves through limestone is of the general order of 15,000 feet per second, while in a compacted shale it may not exceed 8 to 10,000 feet per second. When the lithological character of a bed changes, for example, when a shale changes to a sandy shale, the velocity will increase as the proportion of sand increases.

Certain methods of utilizing this phenomena have recently been advanced. For example, in United States Patent Number 2,137,985 I have shown one way by which a seismic velocity well log can be obtained and interpreted. However, I have found that there is one inherent disadvantage common to prior art methods of determining the seismic velocity through the various strata, which is due to the fact that the change in velocity between beds may be, and quite often is, of a somewhat gradual nature. Geologists are well aware of the fact that where, for example, a bed of sand overlays a bed of shale that there is quite often no definite clearly defined interface between the two formations, the lithological characteristics varying gradually from a shale to a sandy shale to a shaley sand and finally to a more or less pure sand. The corresponding seismic well log taken by any of the methods now known to the art would show a gradual shift in seismic velocity from that characterizing the shale to that characterizing the sandstone. If this shift were rapid enough, the determination of the interface would exhibit no particular difficulty, however, it is very often the case that the boundary cannot be obtained except in a vague general fashion by these methods. It is an object of this invention to provide an improved method for determining the position and depth of these interfaces between strata traversed by a well.

A further object of my invention is to provide a system of well logging in which variations in the seismic velocities of the beds will appear on a log in a highly accentuated manner well suited for correlation. Further objects and advantages of my invention will be apparent from this specification.

This method of well logging can best be described by reference to the accompanying drawings which form a part of this specification and are to be read in conjunction therewith. These drawings illustrate one possible arrangement of apparatus in accordance with my invention. In these drawings corresponding numerals refer to the same or corresponding parts.

Figure 1 shows a diagrammatic cross section of a portion of the crust of the earth traversed by a well and illustrates in diagrammatic form, one possible arrangement of apparatus used in making a well log in accordance with my invention.

Figure 2 shows in greater detail the lower portion of the cross section of the well shown in Figure 1.

Figure 3 illustrates diagrammatically, one type of seismic wave transmitter suitable for use in my invention.

Figure 4 shows a circuit diagram of an apparatus used at the surface to record the indications produced in the well.

Figure 5 illustrates two types of seismic well logs.

Figure 6 shows a diagrammatic cross section of a section of the earth where these well logs were obtained.

Figure 7 shows a modified arrangement of apparatus illustrating a second embodiment of my invention.

My invention in general comprises determining a function of the difference in the seismic velocities in two sections in the well, preferably adjacent to each other. This is accomplished by lowering into the well at least one source of seismic waves and a plurality of receivers for said waves which are placed above and below the transmitter or transmitters. Each time that the transmitter generates a burst of seismic waves, the response from the receiver or receivers above the seismometer is compared in time with the response obtained from the receiver or receivers placed below the instrument. It is found that when such comparisons are made, changes in seismic velocity between two strata will be shown on the resultant log by a pattern which is much more easily distinguishable than would be a single log of the velocities obtained in the formations.

One arrangement by which this system can be accomplished is shown in Figure 1. In this figure, a well 9 is shown drilled into the earth below the surface 10. In this well a transmitter of seismic waves 11 is lowered along with two receivers 12 and 13 which are spaced equidistantly from this transmitter. This equipment is supported by a cable 14 which is unreeled from a reel 15 at the surface of the ground. The cable 14 is a multi-conductor cable which preferably contains at least two leads for each receiver. In the type of apparatus shown in Figure 1, the transmitter is not actuated from the surface and hence is not connected by an electrical conductor with the surface. As shown in Figure 3, it may, for example, suitably consist of a small electric bell ringer 15 and set of batteries 16 connected to the ringer 15 by conductors 17, all suitably encased in a water-tight container 18 which contains a thin diaphragm 19 set in the wall 20 of the container so that the hammer 21 of the ringer, by striking the diaphragm will produce a series of intermittent bursts of seismic energy. Other types of apparatus may, of course, be used. The two receivers are electro-magnetic transducers which produce electric waves in response to the seismic waves which impinge upon them. These electric impulses pass through the conductors in cable 14 to slip rings 22 on reel 15. Insulated brushes 23 bear on these slip rings so that the electric impulses are transmitted through a cable 24 attached to these brushes into the amplifier-comparator 25. After these signals have been compared the resultant output is passed as an electric signal into a recorder 26 and appears as deflections on a well log 27.

Recorder 26 contains a reel of paper which is driven past the recorder in proportion to the depth of the instruments in the well by means of a flexible cable 28 which is connected to a measuring sheave 29 over which cable 14 passes. This part of the system is too well known in the prior art to merit further discussion.

The apparatus in the well is shown in enlarged detail in Figure 2. Certain of the seismic wave paths by which signals emitted by transmitter 11 reach receivers 12 and 13 are also shown diagrammatically. Thus, for example, certain of the waves will travel along more or less direct paths 30 and 31 from transmitter 11 to receivers 12 and 13 respectively. Other waves will propagate outwardly to the interface between the formations and the well bore, along which they will travel, and from which they will be refracted back to the receivers 12 and 13 along paths indicated roughly as 32 and 33. Still other waves will penetrate into the formations along other paths 34 and 35 and will be refracted back to receivers 12 and 13. In general the waves traveling the direct paths 30 and 31 will be passing for the greatest distances through the lowest velocity medium i. e. the mud in the well in which the seismic wave velocity is of the order of 4,500 to 5,000 feet per second. By inspection it can be seen that the waves traveling paths 34 and 35 travel the greatest distance in the relatively high speed compacted formations and hence will be the first to arrive at the instruments 12 and 13. The major part of the path of least time, or hodograph, such as paths 34 and 35 is through the formations and hence the travel time of the waves along these paths is indictative of the velocities of the formations between the transmitter and the two receivers. The difference in these travel times will accordingly represent the difference in the lithological characteristics of the formations along paths 34 and 35.

In Figure 4 is shown one type of recording apparatus which can be employed to record continuously on a strip of photosensitive film, the difference in time between the response of receiver 12 and receiver 13 to each intermittent burst of seismic energy from transmitter 11. In this figure receiver 12 is connected to two conductors 36 and 37 of the multi-conductor cable 14. Similarly receiver 13 is connected to two other insulated conductors 38 and 39 of this cable. At the surface of the ground, the cable passes over the measuring sheave 30 and is wrapped about the reel 15, terminating in four insulated slip rings 22a, 22b, 22c, and 22d, placed on the reel. Four insulated brushes 23a, 23b, 23c, and 23d, respectively bear against these insulated slip rings. These brushes are connected to conductors 44, 45, 46, and 47 to which are attached the primaries of six transformers 48, 49, 50, 51, 52, and 53 in such a manner that three transformers 48, 49, and 50 are connected in parallel to the output of receiver 12, while the other three transformers 51, 52, and 53 are connected in parallel to the output of receiver 13. The secondaries of transformers 48 and 49 are connected together in push-pull relationship to the grids of two gas discharge tubes 54 and 55. One type of tube which has been found to be highly satisfactory is the 884–885 type. The midpoint between the two transformers is connected by a grid bias battery 56 to the common connection between the two cathodes of these tubes. For simplicity in representation, the filament batteries are not represented, but would be connected across the filaments at points "x—x" as will be well known to those skilled in the art. The tubes illustrated are shown as having indirectly heated cathodes, but directly heated cathode type tubes can be used just as satisfactorily. The cathodes of the two gas discharge tubes 54 and 55 are connected through a resistance 57 to the negative pole of a battery 58. The positive pole of this battery is connected to one side of two coils 59 and 60 of a two coil galvanometer 61. The other terminals of these coils 59 and 60 are connected to the plates of the two gas discharge tubes 54 and 55, respectively. The connections to the coils are made in such a sense that current passing through a coil due to conduction in one tube will rotate them both in the opposite direction from that due to current passing through the other coil due to conduction in the other tube.

The positive pole of battery 58 is connected to the negative pole of a second battery 62, the positive terminal of which is connected to a resistor 63. Across the two batteries 58 and 62 and the resistor 63 is shunted a condenser 64. The cathode of a third gas discharge tube 65 is connected through a resistor 66 to the negative pole of battery 58. The plate of this tube 65 is connected to the positive pole of battery 62 through the resistor 63. The grid of tube 65 is connected to the secondaries of transformers 49 and 50 in series and through a bias battery 67 to the cathode of this tube.

The cathode of a fourth gas discharge tube 68 is connected to the cathodes of tubes 54 and 55. The plate of this tube 68 is connected to the cathode of tube 65. The grid is connected to the two secondaries of transformers 50 and 53, connected in series and through a grid bias battery 69 to the cathode of this tube.

The sequence of events in this circuit is as follows: normally all four gas discharge tubes are non-conducting until the receipt of signals from either receiver 12 or 13. As the logging equipment is lowered in the well transmitter 11 intermittently will produce a short burst of seismic energy. For purposes of the discussion let it be assumed that part of this energy reaches receiver 12 before any waves reach receiver 13. Electric waves will be generated in receiver 12 in response to these seismic waves, which after conduction to the surface will appear simultaneously across the secondaries of transformers 48, 49, and 50. This signal will alter the grid potential of tube 55 and render it conducting. Current will immediately flow through tube 55, resistor 57, battery 58 and coil 60 of galvanometer 61, during the time that tube 55 is conducting. Prior to the receipt of the seismic wave, gas discharge tube 68 could not discharge under any circumstances because the cathode and plate are at the same potential until current flows in either resistor 57 or 66. Therefore, this tube would not fire at the instant that tube 55 is rendered conducting. Tube 65 is rendered conducting the same instant as tube 55 since the signal across the secondary of transformer 49 will lower the negative bias on the grid of this tube. Condenser 64 which was previously charged to the combined potential of batteries 58 and 62 now commences to discharge through tube 65 and resistance 66 which is chosen to be of such a value that this discharge is relatively slow. Instantaneously the plate of tube 68 is raised nearly to the combined potential of batteries 58 and 62. The cathode of this tube will be raised in potential somewhat, due to the flow of current through resistor 57, but for a period of time the plate of tube 68 will be considerably more positive than the cathode and hence this tube could be rendered conducting by a suitable lowering of the voltage on the grid. This lowering will occur as soon as the first signal from receiver 13 appears across the secondary of transformer 53. Tube 68 then fires and since resistance 66 is relatively high compared to resistance 57 the upper point of resistance 57 will be raised to a greater potential than the midpoint between batteries 58 and 62. Since this renders the cathodes of both tubes 54 and 55 positive with respect to the plates these tubes will de-ionize and be rendered non-conductive. If receiver 13 were activated first, the only change in this sequence would be that tube 54 would be fired instead of tube 55. In short, one of the two tubes 54 or 55 is selectively rendered conducting by a signal from the first response of the two receivers. A third tube 65 is rendered conducting simultaneously. The fourth tube 68 operates only on the receipt of the wave from the other receiver and proceeds to turn off the discharge in the tube 54 or 55 which had previously fired. Tubes 65 and 68 automatically will cease discharging a short time later when condenser 64 has discharged to such a point that there is not sufficient current flowing through the two tubes to maintain ionization. The circuit is then returned to its initial conditions and is ready for the next cycle of operations as soon as the transmitter sends out the next burst of seismic energy.

A very weak restoring spring is used on galvanometer 61 which is heavily damped and has a period long with respect to the interval between actuations of the seismic transmitter 11. As current flows through one or the other of two coils 59 and 60, only during a short interval of time, namely the interval of time after one receiver has been activated and before the other has been activated, the galvanometer will respond ballistically. The cycle of operation is substantially constant in time, so that as long as there is a constant difference of time along the two seismic wave paths from the transmitter to the two receivers, the coils of the galvanometer 61 will remain at one position angularly offset from the zero position. This follows from consideration of the fact that through one coil of the galvanometer 61 is being passed a current of constant amplitude for a period of time which depends only upon the interval between response of the two receivers. As this interval increases the deflections will increase. When the interval becomes negative, i. e. when the other receiver responds first, the current will flow automatically through the other coil and the galvanometer will deflect in the opposite direction.

The method used for recording observations as a function of the depth of the instrument in a well is not novel with this system. One possible way of accomplishing this satisfactorily is shown in Figure 4. Light from a lamp 70 is focused by means of a lens 71 and is reflected from a mirror 72 on galvanometer 61 to a strip of photosensitive paper 27 on which the actual well log is produced. This photosensitive paper is unreeled from a supply reel 74 on the take-up reel 75 which is moved in direct proportion to the depth of the instruments in the well by means of a suitable gear train 76 driven by a flexible shaft 28 from the measuring sheave 29. Motion of the paper strip 27 is at right angles to the deflection of the light beam from the galvanometer mirror.

Suitable means well known in the art can be used to record depth indicia on the log as the photosensitive paper 27 moves from one reel to the other.

It is to be understood that the circuit shown in Figure 4 is but one of a number of possible circuits by means of which a recording apparatus can be constructed to measure the difference of the travel times from transmitter to the two receivers. The possible number of these types of circuits is limited only by the ingenuity of the circuit designer.

As has been stated earlier in the specification, this type of logging finds particular application to the determination of an effective interface between two formations where the lithological characteristics vary gradually from one formation to the next. An illustration of this is shown diagrammatically in Figures 5 and 6. In Figure 6 is shown a cross sectional view of two adjacent formations which have been pierced by a well 9. The upper formation is sandstone which gradually changes over to a dense limestone in the lower formation. In Figure 5 is shown the type of log A which would be obtained if a single transmitter and a single receiver were used, spaced apart by the distance between transmitter 11 and receiver 13 in Figure 6, and only the travel time between them were determined in accordance with the prior art. The travel time will be greater in the sandstone section and depending upon the way that the transition occurs between sandstone and limestone, will decrease gradually until the travel time is indicative of limestone in the lower portion. There is no definite point which can be picked with certainty as representing the point at which the maximum change in characteristics occurred. Now however, if the method of my invention be used, logs such as log B in Figure 5 will result. The spacing between transmitter and each receiver is shown in Figure 6. Here the log registered zero during the time that all three instruments were in a homogeneous formation. As soon as the lower receiver 12 reached the start of the lime section, the travel time in the lower path decreased and a deflection was observed on the log which increased until the transmitter 11 was located opposite the point of maximum lithological difference between the two formations. After this point had been passed the response gradually decreased to zero as the three instruments progressed into the homogeneous lime section. It is obvious that the effective interface is opposite the point of maximum deflection on this log and that it can be picked with a great deal of certainty. If the transition had been from a high velocity bed to a low velocity bed, the deflection would have been on the opposite side of the zero axis from that shown in Figure 5.

The spacing between a transmitter and receiver is chosen with regard to the detail which is desired. Thus for relatively fine detail, a spacing of the order of 5 to 30 feet is employed, while general lithological changes are logged using spacings of the order of 100 to 200 feet.

This type of logging can be carried on as rapidly and automatically as any other type used at present, and will yield results of greatly increased accuracy as far as the determination of the interfaces between the formations is concerned. Correlations of such logs from different wells in the same region can be made even if the variation in formation characteristics is gradual.

There are many obvious modifications of the apparatus which has been previously described which still come within the scope of my invention. The method can be used with equal certainty if a transmitter is used which is actuated electrically from the surface of the earth rather than the self-actuated type described. Furthermore, if it is desired to compare the travel times across two sections of a well which are not immediately adjacent this can be accomplished by the use of logging apparatus such as is shown in Figure 7. In this figure another section of a well traversing the earth is shown with two receivers 12 and 13 suspended therein, but with two transmitters instead of one. These two transmitters 11 and 77 are energized simultaneously by an electrical cable 78 which passes between them. The seismic wave travel time between transmitter 11 and receiver 13 is then compared with that between transmitter 77 and receiver 12. Any type of comparing circuit can be used with this arrangement of apparatus, for example, that shown in Figure 4. Still other types of modifications will be obvious to those skilled in the art.

It is to be understood that the various figures given in this specification and the explanation given therewith are by way of illustration rather than by way of limitation and that the scope of this invention is best defined by the appended claims.

I claim:

1. In apparatus for seismic differential well logging including a self-energized generator of intermittent bursts of seismic energy in a well and two receivers of seismic waves positioned substantially equidistantly above and below said generator, the improvement which consists of a multi-conductor cable by means of which the output of each of the two receivers is separately conducted to the surface of the ground, a first thyratron tube the grid of which is coupled to the output of one of said detectors, a second thyratron tube the grid of which is coupled to the output of the other of said detectors, means for connecting the outputs of said thyratron tubes to a ballistic recording galvanometer in opposition, and a de-energizing circuit including two thyratron tubes, the grids of each of which are coupled to the outputs of both of said detectors, said deenergizing circuit being so constructed and arranged that current flows in the plate circuits of said first-mentioned two thyratron tubes and said galvanometer only during the time interval between the arrival of each burst of seismic energy at said two receivers.

2. Apparatus for seismic well logging comprising at least one self-energized, intermittent generator of seismic waves and two receivers of seismic waves adapted to be lowered in a well, said receivers being spaced on opposite sides of said generator of seismic waves and adapted to generate electric signals in response to the reception of seismic waves, a multi-conductor cable adapted to suspend the above-mentioned equipment in a well, the conductors of said cable being connected to said receivers, two metering circuits each connected through said cable to only one of said receivers and each adapted to produce direct current pulses of constant amplitude upon arrival of said electric signals generated by the one of said receivers to which said metering circuit is connected, said metering circuits including means for producing an indication proportional to the average difference in current pulses flowing in said two metering circuits, and means connected to said metering circuit and through said cable to both of said receivers adapted to stop production of each of said direct current pulses in said metering circuits at a time interval proportional to the difference in travel time from said generator to said receivers.

3. Apparatus for seismic well logging comprising at least one self-energized periodic generator of bursts of seismic energy and at least two receivers of seismic waves adapted to be lowered into a well and to convert seismic waves into electric waves, said receivers being spaced substantially equidistant above and below said generator, means coupled to one of said receivers and actuated by electric waves produced by said receiver in response to seismic waves impinging thereupon to produce a constant amplitude direct current signal in a first circuit, corresponding means coupled to the other of said receivers and actuated by electric waves produced by said other of said receivers in response to seismic waves impinging thereupon to produce a constant amplitude direct current signal in a second circuit, limiter means coupled to both of said receivers and to said two first mentioned means adapted to limit the operation of each of said two first mentioned means substantially to the period between the reception of each of said bursts of seismic energy at said two receivers, said means and said corresponding means including as a common element an indicator adapted to produce visual indications in response to the difference in electric signals produced in said means and said corresponding means, the vibratory period of said indicator being considerably greater than the time intervals between bursts of seismic energy generated by said generator.

HENRY SALVATORI.